May 31, 1966     E. F. STEINERT     3,254,318
WELDING APPARATUS
Filed Oct. 16, 1962                                    2 Sheets-Sheet 1
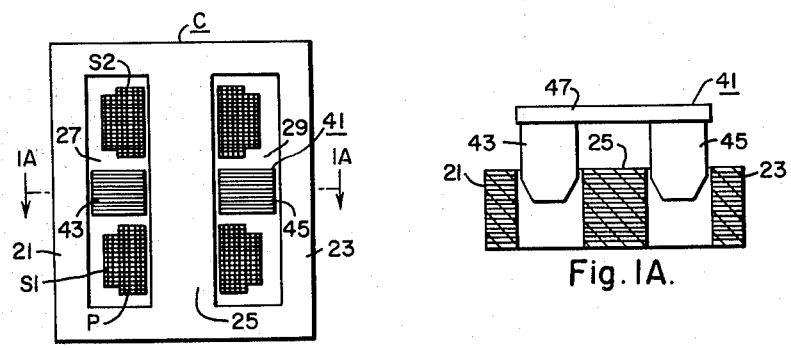
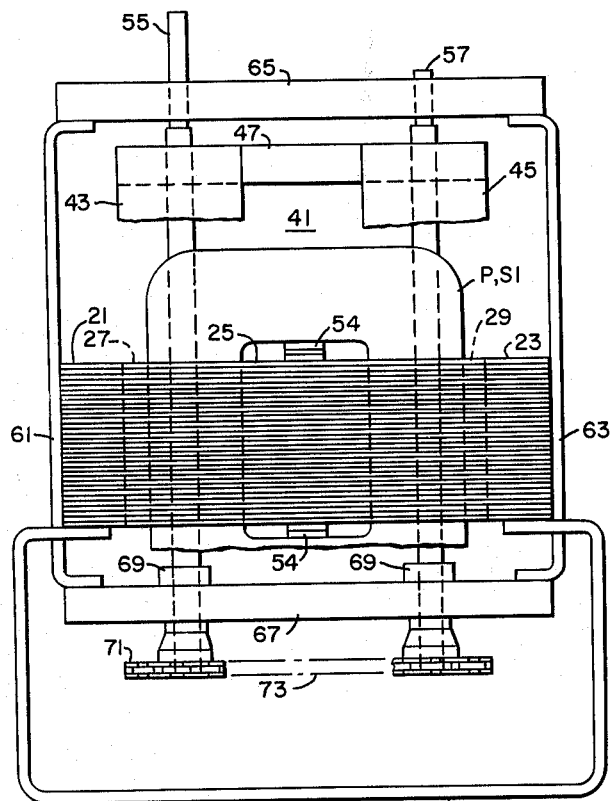
WITNESSES:
Bernard R. Gieguey
James T. Young
INVENTOR
Emil F. Steinert
BY
Hyman Diamond
ATTORNEY May 31, 1966  E. F. STEINERT  3,254,318
WELDING APPARATUS Filed Oct. 16, 1962  2 Sheets-Sheet 2

United States Patent Office 3,254,318
Patented May 31, 1966

3,254,318
WELDING APPARATUS
Emil F. Steinert, Williamsville, N.Y., assignor to Westinghouse Electric Corporation, Pittsburgh, Pa., a corporation of Pennsylvania
Filed Oct. 16, 1962, Ser. No. 230,974
2 Claims. (Cl. 336—133)

This invention relates to arc welding and has particular relationship to arc welding apparatus for supplying current for welding. A need has developed for light, low-cost, general purpose welding apparatus for delivering welding currents of selectively variable magnitude and it is an object of this invention to provide such apparatus. A more specific object of this invention is to provide a compact, efficient, economical, alternating-current welding unit of relatively simple and low-cost construction for supplying current for welding work with an electrode.

A more general object of this invention is to provide a novel transformer for supplying currents of different rating at different voltages.

In accordance with this invention, welding apparatus is provided including a power-supply transformer having a shell-type core of laminated structure which includes outer legs and a center leg. Windows are defined by each of the outer legs and the center leg. Preferably the flux-transmitting cross-sectional area of the center leg is approximately twice the flux-transmitting cross-sectional area of each of the outer legs.

This transformer has a primary and a plurality of secondaries. The primary and one of the secondaries, which may be considered a main secondary, are mounted in inductive relationship contiguously on the center leg in one region. Other secondaries which may be considered auxiliary secondaries, are mounted in another region of the center leg spaced from this one region. The secondaries are connected in voltage-adding relationship. Different overall voltages for welding may be derived selectively from the secondaries by including only certain or the auxiliary secondaries in the welding circuit. The supply voltage at any setting may be varied continuously by a movable shunt core which is movable in and out of the windows of the shell-type core and may be set in any position with reference to these windows. This core carries leakage flux and is so positioned that it diverts flux from the auxiliary secondaries.

The shunt core is tapered at the lower end. The tapering has the effect of increasing the range over which the welding current is variable in each tap setting of the apparatus over the range achievable with a square core. In addition, the concentration of flux density which would exist for a square core at the entrance to the windows is relieved.

Typically, the auxiliary secondaries have two connections providing respectively a higher-voltage lower-current setting and a lower-voltage higher-current setting. At each of these settings, the movable shunt core provides stepless current adjustment over the range corresponding to minimum current when the core is in complete shunting relationship to the flux to maximum current when the core has been removed substantially completely from the windows.

Typically, the primary is rated to be supplied at 230 volts nominal rating and at the higher voltage setting of the secondary is capable of delivering secondary voltage of 80 volts. This voltage affords optimum arc-striking voltage and stability characteristics which are essential for the more critical welding with a stick electrode of the low hydrogen type. At the low-voltage setting, the transformer is capable of delivering an open-circuit voltage of 55 volts with 230 volts across the primary. At this voltage higher welding current output is provided for limited line-current input.

The construction is such that the maximum current output at the higher-voltage lower-current range does not exceed the line current input to the primary at the maximum setting of the lower-voltage higher-current range. This is the standard condition required for a limited input arc-welding power supply.

This invention is intimately related to general purpose, low-current arc welding. To the extent that this invention may have applicability to arc melting, the application of this invention to arc melting is regarded within the scope of this application. Under such circumstances the reference in the claims and throughout the specification to arc welding is intended to include within its scope arc melting.

The novel features considered characteristic of this invention are disclosed generally above. For a more complete understanding of this invention, both as to its organization and to its method of operation, together with additional objects and advantages thereof, reference is made to the following description taken in connection with the accompanying drawings in which:

FIG. 1 is a top view generally diagrammatic of a transformer in accordance with this invention.

FIG. 1A is a view in section taken along line 1A—1A of FIG. 1.

FIG. 2 is a view in side elevation of actual apparatus in accordance with this invention with the cabinet or casing removed.

Figure 3:
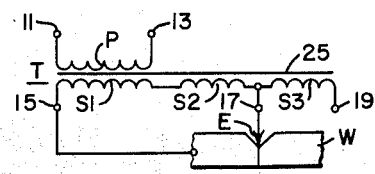
FIG. 3 is a schematic of apparatus in accordance with this invention.

In the drawings apparatus for welding an electrode E with work W is shown (FIG. 3). This apparatus includes a transformer T having a primary P, main secondary S1 and auxiliary secondaries S2 and S3. The primary P is provided with the usual terminals 11 and 13 for connecting to a power supply. The secondaries S1, S2, S3 are connected internally in series adding relationship. Taps 15, 17 and 19 extend from the extreme terminals of S1 and S3 and from the junction of S2 and S3. These taps 15, 17, 19 permit the impressing of a higher voltage across the electrode E and the work W between taps 15 and 19 or a lower voltage between taps 15 and 17.

The windings P, S1, S2 and S3 are mounted in magnetic inductive relationship on a core C of the shell type. This core has outer legs 21 and 23 and a center leg 25 bounding windows 27 and 29. The flux transmitting cross-section of the center leg 25 is twice that of each of the outer legs 21 and 23. The primary P and the secondary S1 are mounted continuously on the center leg 25 at one end. As shown in FIG. 1 the secondary S1 is mounted around the primary P. The windings P and S1 may also be mounted adjacent each other. The secondaries S2 and S3 are mounted contiguously on the center leg 25 at the opposite end. These windings may also be mounted adjacent each other rather than one on the other as shown.

Figure 4:
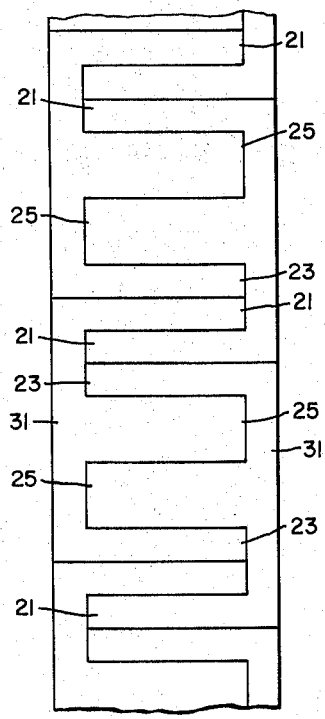
FIG. 4 is a generally diagrammatic view showing the manner in which the punchings for the transformer in accordance with this invention are produced.
Figure 5:
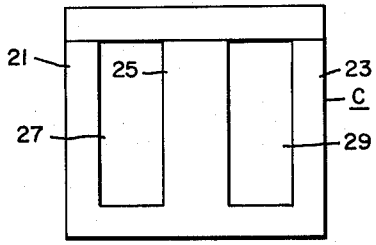
FIG. 5 is a view in top elevation showing how the core is derived from the punchings.

The shell-type core C may be formed as shown in FIGS. 4 and 5. The core is formed by stacking punchings 31 stamped from a strip 33 having a width of a leg 21 or 23. From this strip the punchings can be stamped. The punchings may be stamped with alternate punchings derived from laterally opposite portions of the strip interlocked with each other so that there is no loss of material. The punchings are stacked interleaved so that a laminated core as shown in FIG. 5 is produced. The core is of the same thickness throughout. The width of each of the outer legs 21 and 23 is equal to half the width of the center leg 25. The windings T, S1, S2, S3 are mounted on the center leg of the core and are held in the center leg by wedges 54 between the center leg 25 and each of the winding assemblies.

The transformer T includes a movable shunt core 41. This core 41 (FIGS. 1A, 2, 3A) is made up of two sets 43 and 45 of I punchings tapered at the lower end (FIG. 1A) inter-connected by a strip 47. Each set 43 and 45 of I punchings is made up of two halves 49 and 51 separated by an internally threaded spacer or nut 53.

The shunt core 41 is movable in and out of the windows 27 and 29 of the fixed main core C. The mounting of the shunt core for such movement is generally similar to the mounting disclosed in Miller Patent 2,840,789 (see FIGS. 1, 3, 4).

Figure 3A:
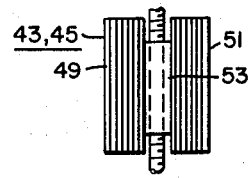
FIG. 3A is a view in side elevation of the shunt core of the transformer according to the invention.

The movable shunt core is suspended from threaded shafts 55 and 57 which screw into the nuts 53 between the halves of the core parts 49 and 51 (FIG. 3A). The shaft assembly is supported from opposite brackets 61 and 63 (FIG. 2) which are suspended from the legs 21 and 23 of the fixed core C. These brackets 61 and 63 are generally channel shaped and bars 65 and 67 are secured between their ends. The shafts 55 and 57 pass through the bars 65 and 67 and each shaft 55 and 57 is provided with a collar 69 which engages the lower bar 67. At their lower ends the shafts carry sprockets 71 interconnected by a chain 73. By rotation of the threaded shafts the movable shunt core may be moved upwardly or downwardly into or out of the windows. By rotating shaft 55 the movable core 41 may be moved upwardly and downwardly in and out of the windows 27 and 29.

Figure 6:
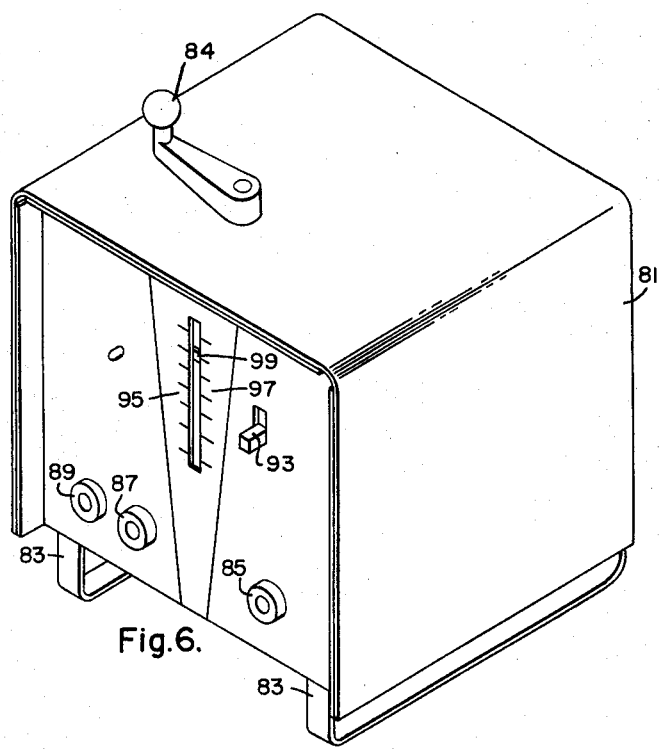
FIG. 6 is a view in perspective showing the complete apparatus in accordance with this invention.

The apparatus in accordance with this invention includes a metal casing or cabinet 81 (FIG. 6). The transformer T is suspended by its core C from brackets 83 secured to the core which extend through the casing 81. The cores are movable by a handle 84 on the shaft 55 which extends through the top of the casing 81.

The casing 81 is provided with a front panel through which a plurality of jacks 85, 87, 89 extend. The end tap 15 of secondary S1 and the taps 17 and 19 of secondaries of S2 and S3 are connected to these jacks 85, 87 and 89 respectively. In addition, the front panel is provided with a switch 93 for turning the apparatus on and off and scales 95 and 97 on opposite sides of a vertical slot through which a marker 99 on one side of the movable core 41 is visible. The scales 95 and 97 are graduated in amperes; based on suitable calibrating in terms of core position; 95 for the higher-current range and 97 for the lower-current range.

In the use of the apparatus, the work is connected through a suitable plug (not shown) to the work terminal 85 which is in turn connected to the secondary S1. Depending on the welding electrode E and the character of the work W to be welded, the electrode is connected to the higher-current or lower current terminal 87 or 89. An arc may then be fired and the welding carried out.

The tapered shunt core 41 (FIG. 1A) has the advantage of affording a wide current range at each tap setting and of relieving flux concentration at corners.

The apparatus disclosed herein is a low cost alternating-current welding unit having wide untility. While a preferred embodiment of this invention has been disclosed herein many modifications thereof are feasible. This invention then is not to be restricted except insofar as is necessitated by the spirit of the prior art.

I claim as my invention:

1. Arc-welding apparatus for welding work with an electrode by flow of welding current through an arc between said electrode and work, said apparatus including a transformer having a fixed core of shell structure having a center leg and two outer legs, windows in said core bounded by said center and outer legs, said transformer including primary-winding means and first secondary-winding means mounted on said center leg in one region of said center leg so that substantially the total flux induced in said center leg by said primary-winding means threads said first secondary-winding means, and second secondary-winding means mounted on said center leg in another region of said center leg, said second secondary-winding means having a plurality of taps providing connections between portions of said second secondary-winding means, said transformer also including a movable core movable into and out of said windows between said one region and said other region and providing a leakage-flux path for diverting said flux induced by said primary-winding means from said other region to variably change the internal reactance in circuit with said second secondary-winding means to vary said welding current, means connected to said movable core for setting said movable core in a selected position with respect to said window to set said last-named reactance to set said welding current, means connecting said first and second secondary-winding means in series adding relationship, means connected to said taps and to said first secondary-winding means for connecting said electrode and work in power-deriving relationship with said first secondary-winding means and the portion of said second secondary-winding means between said first winding means and a selected tap of said second secondary-winding means.

2. Arc-welding apparatus for welding work with an electrode by flow of welding current through an arc between said electrode and work, said apparatus including a transformer having a fixed core of shell structure having a center leg and two outer legs, windows in said core bounded by said center and outer legs, said transformer including primary-winding means and first secondary-winding means mounted on said center leg in one region of said center leg so that substantially the total flux induced in said center leg by said primary-winding means threads said first secondary-winding means, and second secondary-winding means mounted on said center leg in another region of said center leg, said second secondary-winding means having a plurality of taps providing connection between portions of said second secondary-winding means, said transformer also including a movable core movable into and out of said windows between said one region and said other region and providing a leakage-flux path for diverting flux from said other region so that the internal reactance of said second secondary-winding means may be varied and with this variation said welding current may be varied, said movable core being tapered in the region where it first enters said windows as it is moved into said windows so that said welding current may be varied continuously over a wide range, means connected to said movable core for setting said movable core in a selected position with respect to said window, means connecting said first and second secondary-winding means in series adding relationship, means connected to said taps and to said first secondary-winding means for connecting said electrode and work in power-deriving relationship with said first secondary-winding means and a portion of said second secondary-winding means, said portion being included between said first winding means and a selected tap of said secondary-winding means.

References Cited by the Examiner

UNITED STATES PATENTS

| | | | |
|---|---|---|---|
| 509,770 | 11/1893 | Scott | 336—214 |
| 848,935 | 4/1907 | Troy | 336—133 X |
| 1,323,770 | 12/1919 | Johannesen | 336—165 X |
| 2,555,911 | 6/1951 | Anderson | 336—133 |
| 2,567,617 | 9/1951 | Pedersen | 336—133 |

ROBERT K. SCHAEFER, *Primary Examiner.*

JOHN F. BURNS, *Examiner.*

W. M. ASBURY, *Assistant Examiner.*